INVENTOR.
WALTER BROWN
BY Edward Dugas
ATTORNEY

INVENTOR.
WALTER BROWN
BY
Edward Dugas
ATTORNEY

INVENTOR.
WALTER BROWN

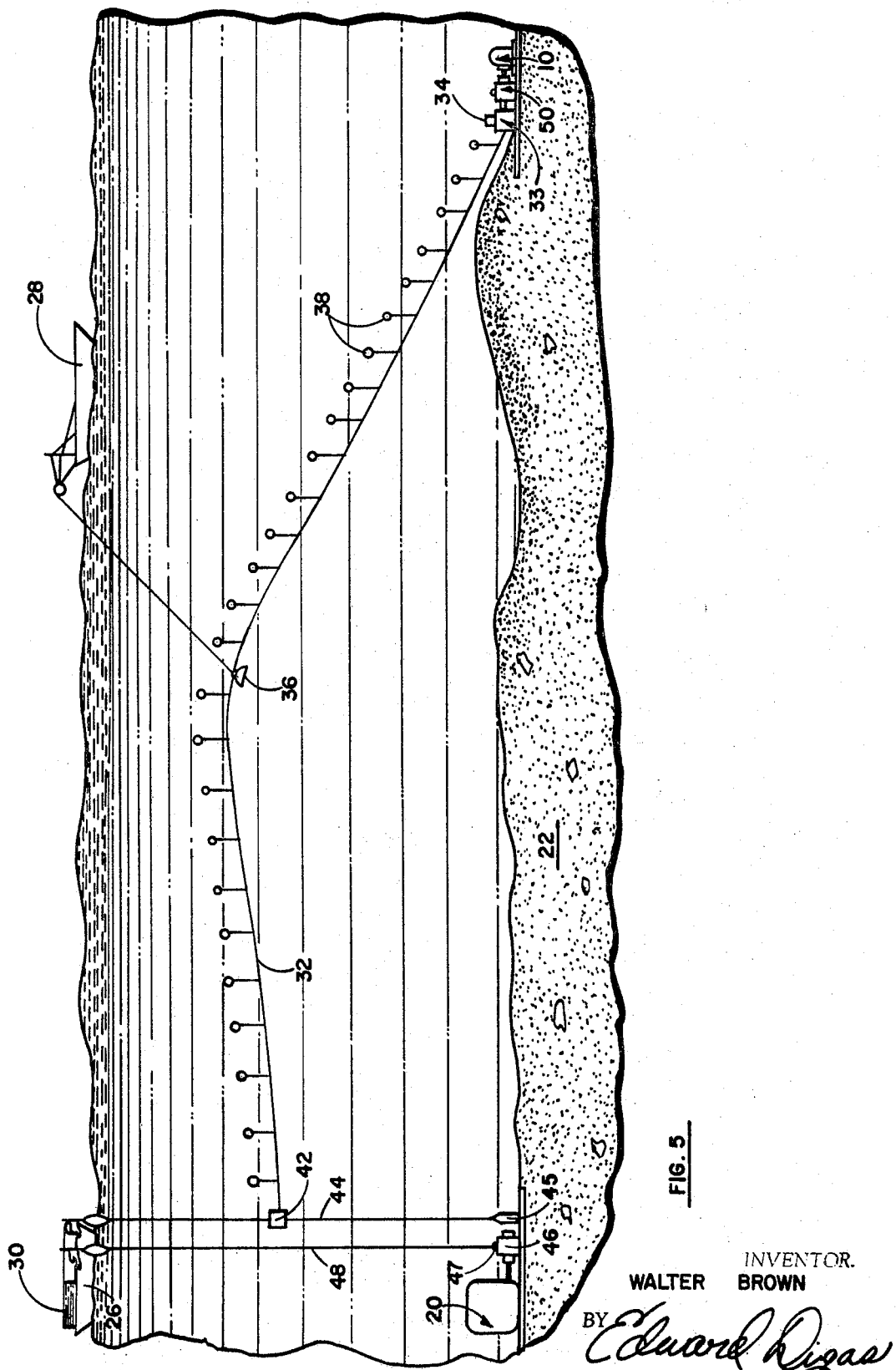

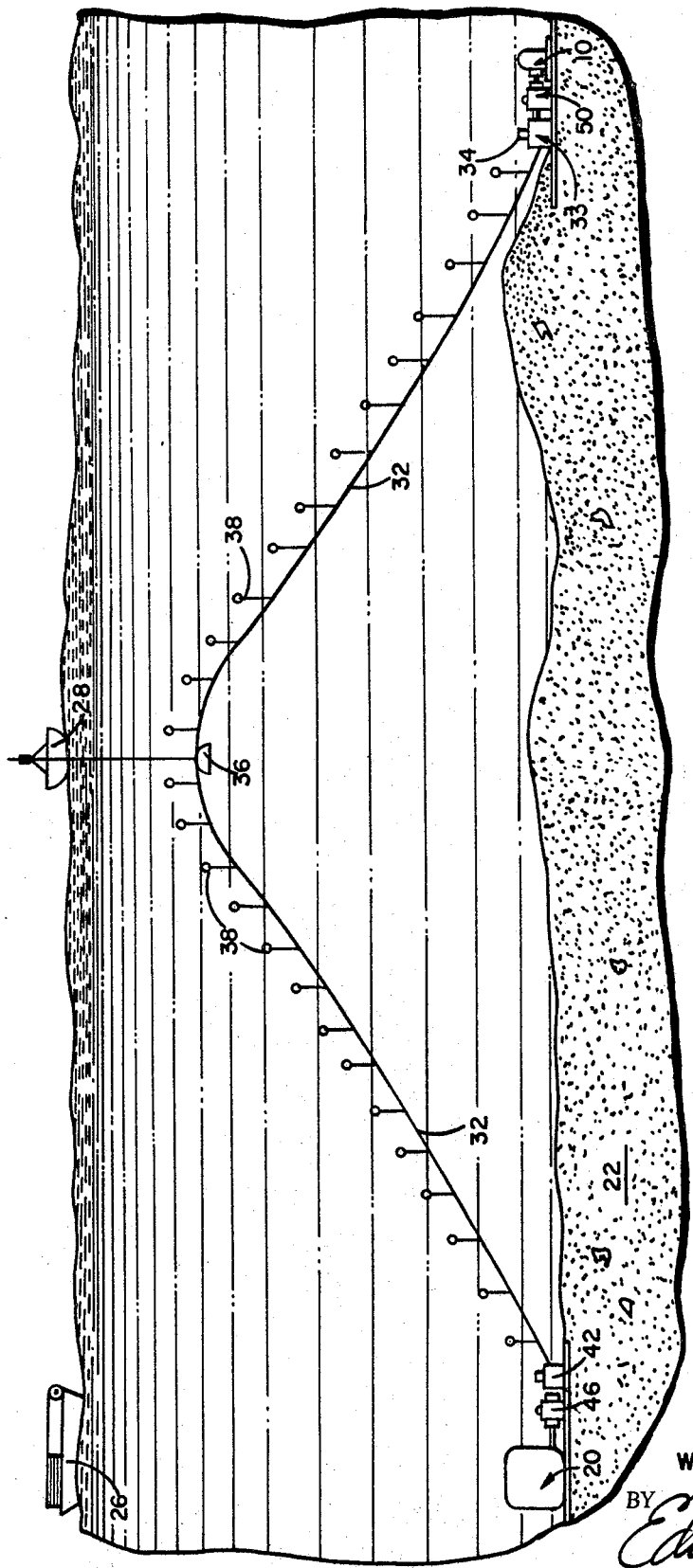

United States Patent Office 3,524,325
Patented Aug. 18, 1970

3,524,325
METHOD FOR CONNECTING PIPE BETWEEN
TWO UNDERWATER COMPLEXES
Walter Brown, Long Beach, Calif., assignor to
North American Rockwell Corporation
Filed May 17, 1968, Ser. No. 730,197
Int. Cl. F16l 1/00
U.S. Cl. 61—72.3                                          3 Claims

ABSTRACT OF THE DISCLOSURE

A lay barge is positioned above an underwater complex and continuous sections of pipe are lowered and connected to a connector at the complex. Flotation means are positioned along the length of the pipe to maintain the pipe partially buoyant and to prevent undue bending stress in the pipe. The lay barge then moves towards a position above a second complex, playing out pipe as it goes. An auxiliary barge is positioned at the halfway point. When the lay barge reaches the halfway point, a shoe-type support is connected to the pipe and the lay barge continues on to its final position above the second connector. As the lay barge moves to the final position, the shoe is allowed to descend to maintain the pipe in a substantially straight line. When the lay barge is in the final position, the pipe is cut, a connector stinger is secured to it and the pipe is lowered along guidelines to meet with the second complex's connector. As the pipe end is lowered, the shoe is raised slightly to allow the end of the pipe to travel straight down to the connector. With both connections made, the auxiliary barge moves off substantially perpendicular to the length of pipe and lowers the shoe to the bottom, thereby laying the pipe on its side. The shoe is then disengaged and the flotation devices removed to complete the operation.

BACKGROUND OF THE INVENTION

The present invention pertains to the field of underwater flowline connections and more particularly to a method for connecting pipe between two underwater complexes separated from each other by a substantial distance. With the increased demand for oil and gas products, there has arisen a need for discovering new sources of raw material. One solution to this problem has been to locate oil fields at offshore locations. Initially, these offshore oil fields were located in relatively shallow water and techniques for drilling that had been used on land were used at these offshore locations. But as the locations moved further out into deeper and deeper water, it became necessary to locate the well heads on the ocean floor. The production from these deep water wells is transported through flowlines which lie on the ocean floor and which connect the wells to an on-shore facility, or to a storage barge positioned at the surface above the well, or in more recent times to an underwater storage facility which is centrally located and which stores the crude products until a surface vessel or barge comes by to unload the underground storage vessel. Flow pipes can be laid from one underwater facility to another facility by the use of submarines and divers, but such a method is costly and time consuming in that to make the necessary connections and alignments underwater requires much more time and effort than would be required if the same operation was conducted above water. Various methods and devices exist in the prior art for attaching one section of pipe to another section of pipe without the use of divers and submarines. In some instances, the depth of the well is beyond the reach of divers and also located at extremely large distances from shore making it necessary to transport a submarine to the local area utilizing a tow vehicle.

Two methods of laying long lengths of pipe are in common use in the offshore oil production art. One such method is the coiling of long lengths of pipe on large drums connected to a ship and letting the pipe cut as the ship moves from one point to the other cutting the pipe at the computed length and lowering the entire assembly for connection to the two complexes. The other method is loading long lengths of pipe on the ship and stove piping (welding one length to the other one at a time and releasing the pipe string into the water while the ship slowly progresses). Various deep-sea flowline connections which can remotely connect one end of pipe to another end. Guidelines and guide-pin techniques are used to guide the pipe to the bottom and to facilitate the connection. The biggest difficulty encountered with these prior known methods is that the required pipe length is not exactly known. With underwater facilities spaced four thousand to six thousand feet apart on the bottom of the sea, the known horizontal and vertical distances contain considerable possible deviations. For example, the configuration and density of the sea bottom between the connective points would require that the pipe loop around some obstacles follow hills and valleys and sink into soft mud beds. All of these contingencies would come into play in the determination of the pipe length. It would therefore be highly desirable to have a method whereby two underwater complexes could be connected with a length of pipe wherein the exact length was not critical for making the required connections.

One method of interest for background material is disclosed in U.S. Pat. No. 3,352,356 entitled Method for Connecting a Flowline to an Underwater Well by C. E. Wakefield, Jr. In that patent, the flowline is made floatable and connected to a production head at the surface of the water prior to lowering the production head to the well. The buoyancy of the flowline is controlled as the flowline is lowered to the well head and when the connection is made between the well head and the production head, the buoyancy and the flowline is decreased and the pipe is allowed to sink to the bottom. This method is directed to making one connection at an underwater complex. It does not attempt to solve the aforementioned problem of making underwater connections at or between two complexes.

Another patent of interest is U.S. Pat. No. 3,298,092 entitled Connection of Underwater Flowlines by J. R. Dozier et al., wherein a flowline is connected to a well head underwater by remote means. That particular invention again is directed only to method and apparatus for connecting one end of a flowline to an underwater complex.

SUMMARY OF THE INVENTION

In the preferred method of the invention, pipe is lowered and connected to a first underwater complex. Flotation means are fixed along the length of the pipe to maintain the pipe partially buoyant and to prevent undue bending stresses therein. Pipe is then played out in a direction towards a second complex. At approximately the half-way point between the two complexes, an auxiliary barge is positioned on which is affixed a cable-mounted supporting shoe. The shoe is connected to the played-out pipe at the half-way point and as the pipe is continually laid out, the shoe is allowed to descend to maintain the pipe in a substantially straight line between the water surface and the first complex connector. When the pipe is directly above the second complex, the pipe is cut and lowered along a guideline in a substantially straight line to the second complex and connected thereto. As the pipe is lowered, the shoe is raised slightly and later lowered slightly to allow the end of the pipe to traverse the straight line. When the connection is made at the second complex, the barge supporting the shoe moves off in a substantially perpendicular path to the length of the pipe and as the barge moves off, the shoe is allowed to descend to the ocean bottom causing the pipe to lay on its side. The flotation means are then removed and the operation is completed. The added length of pipe that exists in the loop because the pipe does not directly move along a straight line between connectors is used somewhat automatically to compensate for any deviations caused by obstacles located on the bottom and for variations in depth. All connections as to sections of pipe are made above water where it is easiest to do with the two end connections being made remotely from the surface without the need for divers or submarines.

Accordingly, it is an object of the present invention to provide an improved method for connecting two underwater complexes.

It is another object of the present invention to provide an improved method for laying and connecting pipe underwater.

It is a further object of the present invention to provide a method of laying pipe underwater which automatically compensates for inaccuracies in the determination of the length of pipe actually needed.

It is another object of the present invention to provide a method for laying pipe underwater wherein most of the steps are performed above water.

The aforementioned and other objects of the present invention will become more apparent when taken in conjunction with the following description and drawings, throughout which like characters indicate like parts, and which drawings form a part of this application.

BRIEF DESCRIPTION OF THE DRAWINGS

FIG. 5 is a diagrammatic view illustrating the continuous pipe running from a first complex at one end with the other end being lowered to a second complex while the center portion thereof is supported by the auxiliary barge; and FIG. 6 is a diagrammatic view illustrating the length of pipe positioned at its ends ready for connection to each of the complexes with the center portion thereof supported by and being lowered from the lay barge to the bottom of the ocean.

BRIEF DESCRIPTION OF THE PREFERRED EMBODIMENT

Figure 1:
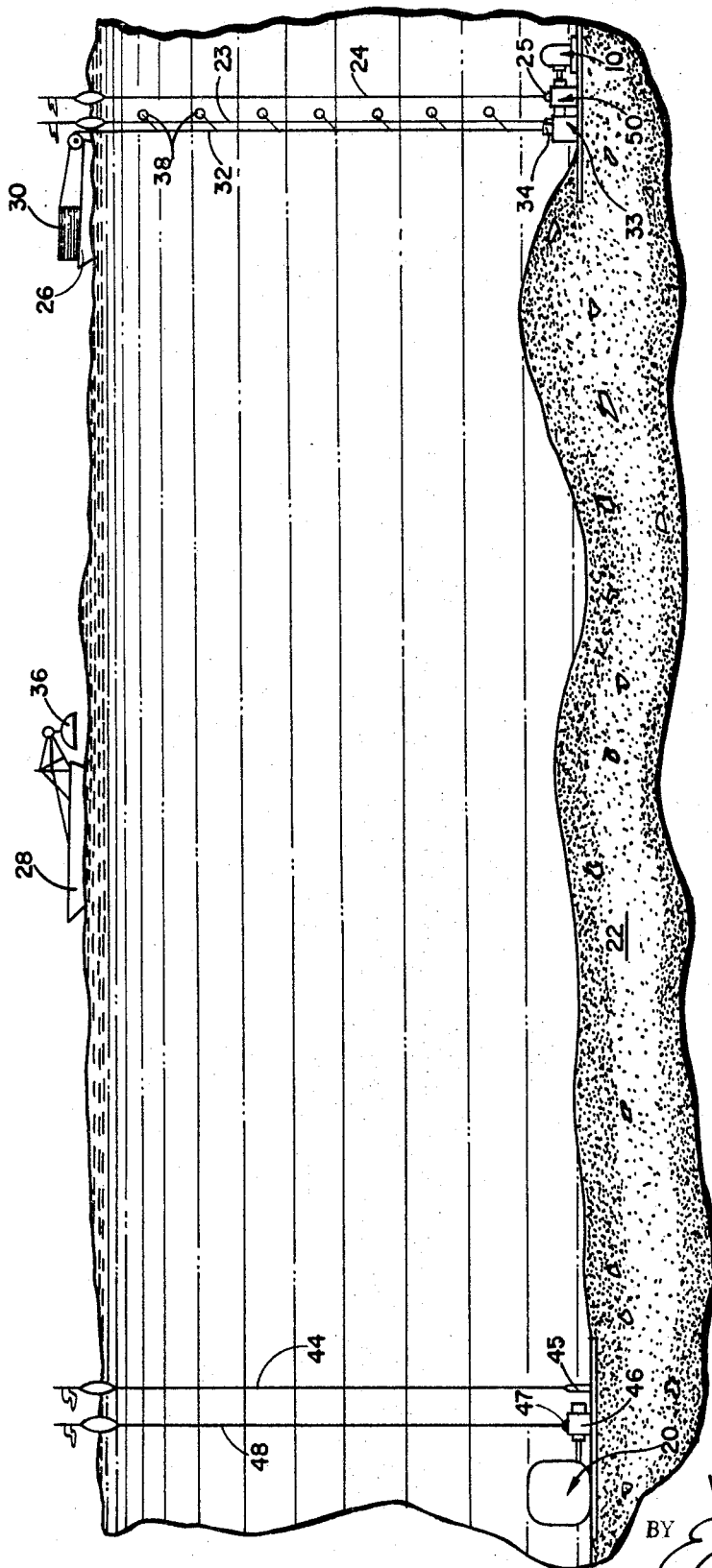
FIG. 1 is a diagrammatic view illustrating an underwater complex with one end of a section of pipe being attached thereto from the surface.
Figure 2:
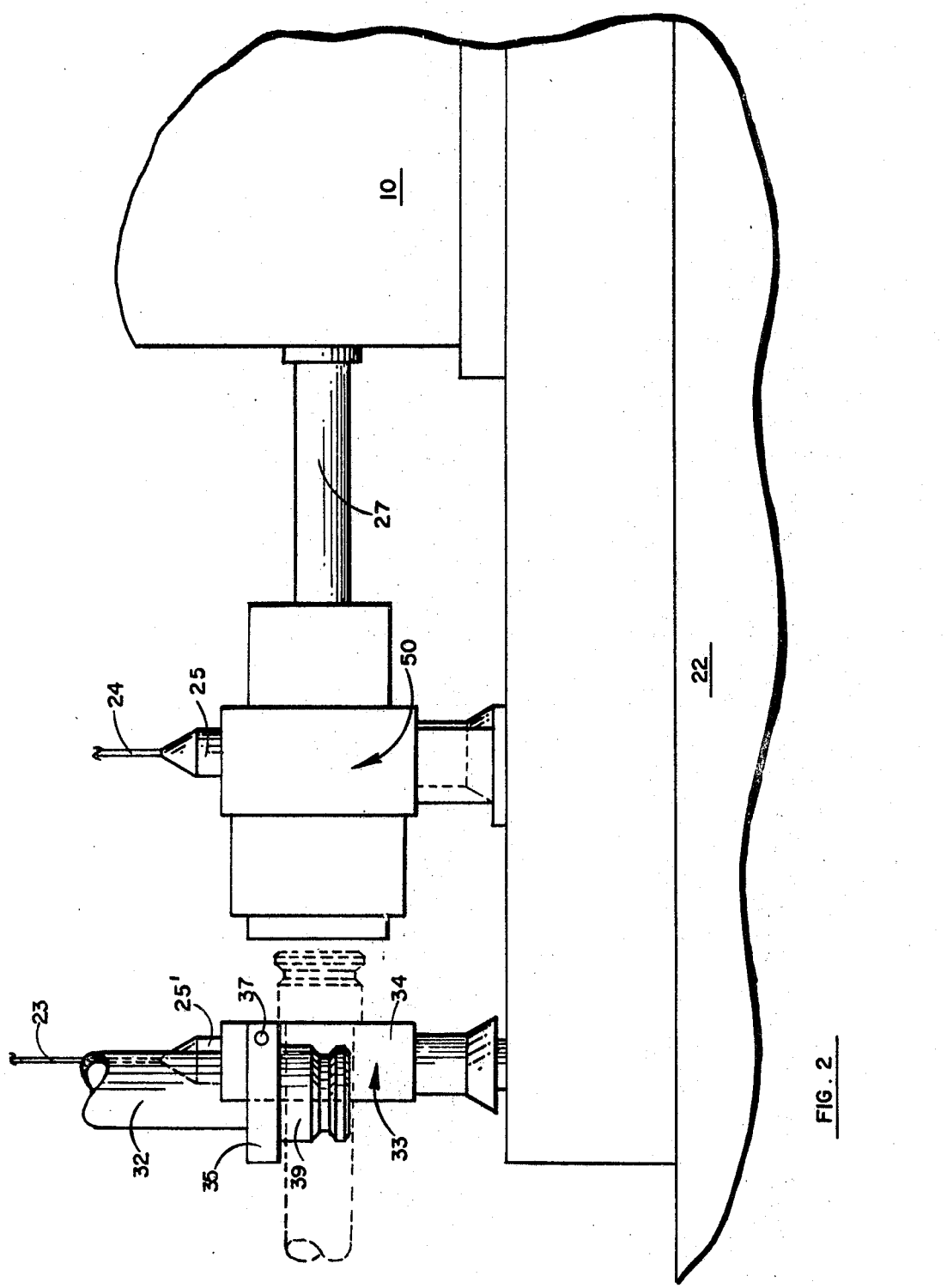
FIG. 2 illustrates a connector which may be used in applying the method of this disclosure to connect the length of pipe at its ends to underwater complexes.

Referring to FIG. 1, in combination with FIG. 2, two underwater complexes, which may for example be production well heads 10 and storage tank 20, are shown separated apart a considerable distance on the ocean bottom 22. Adjacent well head 10 is a guide pin 25 to which is attached a guideline 24 that extends to the surface. An extending connector 50 is lowered along the guideline 24 and positioned by the guide pin 25 in correct alignment with the well head 10. The connector 50 is connected to the well head 10 through a length of pipe 27 by means well known within the art. Adjacent guide pin 25 is a second guide pin $25^1$ with a guideline 23 attached thereto. A continuous length of pipe 32 is lowered from the surface along the guideline 23. Attached to the end of pipe is a pivot frame 33 having one member 34 which fits onto the guide pin $25^1$ and a second member 35 which holds the end of pipe 32 and which is pivotly mounted to member 34 by means of a pivot joint 37. The end of pipe 32, commonly called a stinger, is formed as a mating connector 39 which is adapted to be received and locked into the connector 50. Connected along the pipe 32 at various intervals are a plurality of flotation means 38 which may be buoys of buoyant material attached to the flow pipe by releasable cables. Various means may be used to provide the pipeline with buoyancy and such means are well known within the prior art. One such means is disclosed in the aforementioned U.S. Pat. No. 3,352,356 where smaller pipes are attached in the form of a bundle to a main pipe and either air or water are allowed to flow through the smaller pipes to give the desired buoyancy characteristic to the long flowline. The lay barge 26 supports a large coil of pipe 30 with an auxiliary lay barge 28 positioned at approximately the mid-point between complexes 10 and 20. The auxiliary barge 28 supports a shoe assembly 36 from the end of the cable such that the shoe assembly can be moved from the surface of the ocean to the bottom. There is positioned at complex 20 a connector 46 which is identical to connector 50, guide pins 45 and 47 which are identical to guide pins $25^1$ and 25 respectively, and guidelines 44 and 48 which correspond to guidelines 23 and 24 respectively.

Figure 3:
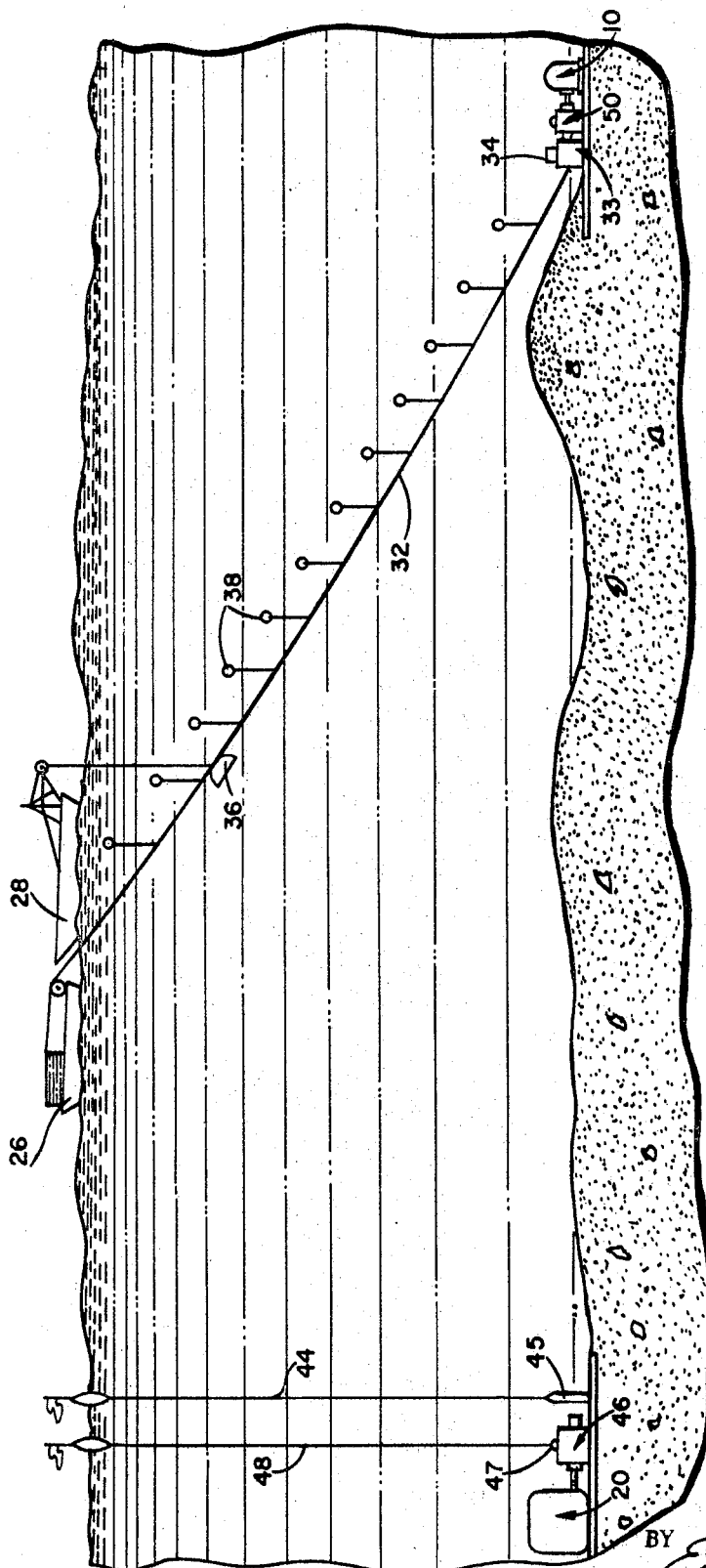
FIG. 3 is a diagrammatic view illustrating the shoe being attached from an auxiliary barge at approximately the mid-position between two underwater complexes.

Referring now to FIG. 3, the guidelines 23 and 24 are removed and the lay barge 26 plays out the cable 32 and proceeds towards the second complex with the flotation means 38 supporting the flow pipe 32 in a substantially straight line from the first complex 10 to the lay barge 26. Flotation support must be given to the flow pipe 32; otherwise, excessive bending stresses will be encountered in the pipe possibly causing a break or other such failure. When the lay barge 26 reaches the auxiliary barge 28, the shoe is affixed to the flow pipe 32. As the lay barge 26 continues on, the shoe 36 is controllably lowered so as to maintain the substantially straight line of the flow pipe between the first complex and the lay barge 26. Connector 50 can be connected to stinger 39 at any time after the flow pipe at this end is in alignment with connector 50.

Figure 4:
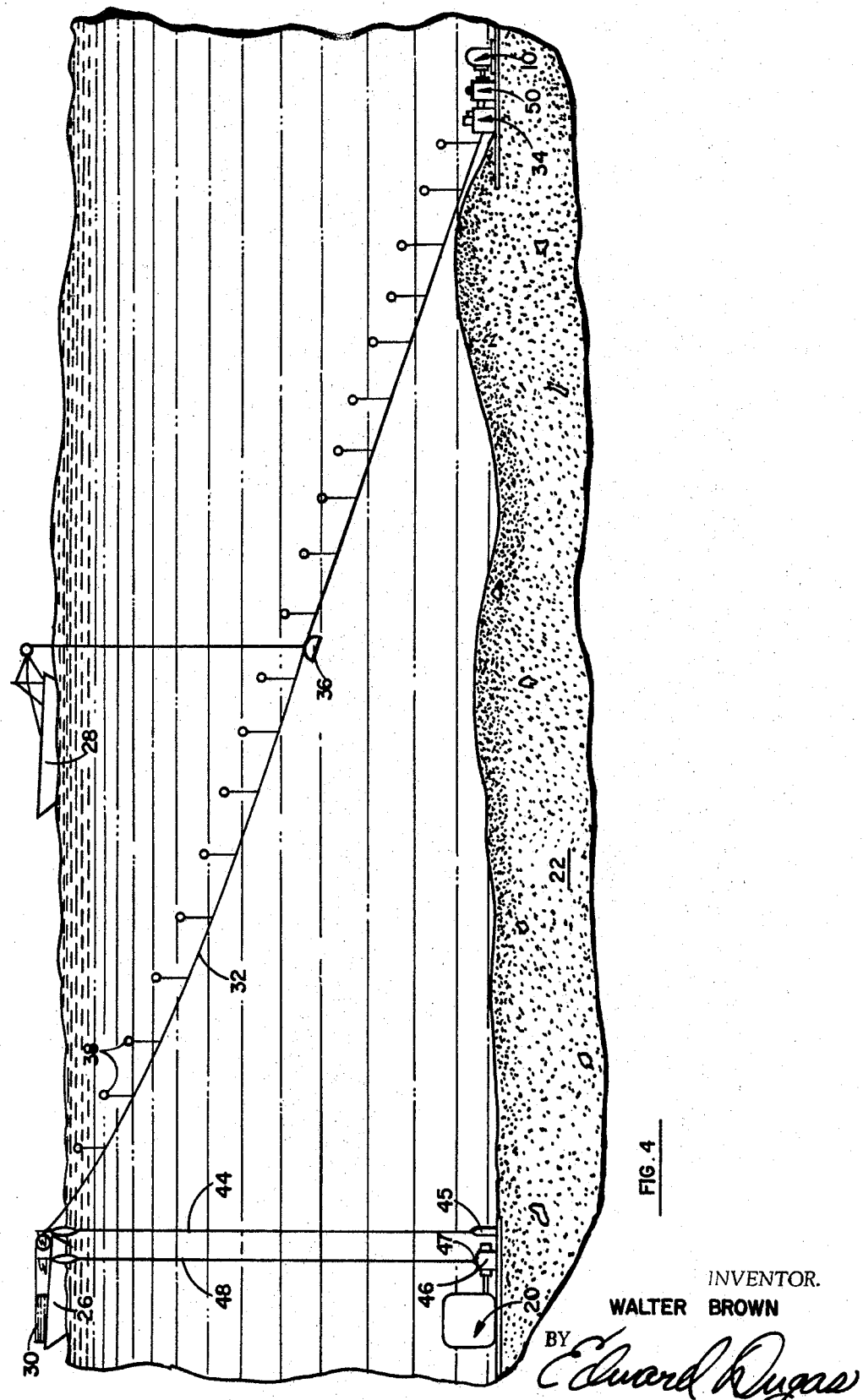
FIG. 4 is a diagrammatic view illustrating a continuous pipe connected between a first complex and running in substantially a straight line to a barge positioned above a second complex.

Referring to FIG. 4, the lay barge 26 is in position above the second complex 20 with the pipe 32 extending in a substantially straight line from the first complex 10 to the lay barge 26. The auxiliary lay barge 28 is supporting the flow pipe 32, at the mid-point, with shoe 36.

In FIG. 5, the flow pipe 32 has been cut at the lay barge and a connector 42 fixed to the cut end. A guideline 44 or other type guiding means guides the end 42 as it is lowered from the lay barge and connected to the second complex 20. As the end 42 is lowered to mate with connector 46 at complex 20, it must be lowered in substantially a straight line in order not to foul or break the guideline 44. This is accomplished by having the auxiliary barge 28 pull the shoe 36 up and later lowering it slightly to an amount sufficient to allow the connector 42 to track along a substantially straight line from the surface to the bottom.

In FIG. 6, the connector 42 is in position for connection to complex 20 through the connector 46. The mid-portion of the flow pipe 32 is being supported by the shoe 36 and the lay barge 28 and the flotation buoys 38. At this point, connection is made to complex 20 by activating the stinger connectors from the surface. With the connections made, the guidelines 44 and 48 are removed to clear the area. The auxiliary barge 28 then moves off in a direction substantially perpendicular to the axis of the flow pipe while simultaneously allowing the shoe 36 to decscend to the ocean bottom thereby laying the pipe 32 on its side. The shoe 36 is then disconnected from the pipe along with the flotation means 38. Any obstacles encountered on the ocean floor such as soft muddy spots, hills and other projections can be accounted for because of the extra slack maintained in the flowline.

While there has been shown what is considered to be the preferred method of the present invention, it will manifest that many changes and modifications may be made therein, without departing from the essential spirit of the invention. It is intended, therefore, in the annexed claims to cover all such changes and modifications as may fall within the true scope of the invention.

What is claimed is:

1. A method for connecting pipe between two underwater complexes; each underwater complex provided with a connector for receiving said pipe, comprising the steps of:
   (a) lowering continuous sections of pipe from a lay barge located above one of said complexes;
   (b) simultaneously while lowering said pipe affixing buoyant means to said pipe sections to support said pipe;
   (c) connecting the end of said pipe to said complex connectors;
   (d) positioning an auxiliary barge approximately midway between said complexes and moving said lay barge to said auxiliary barge while playing out pipe;
   (e) attaching said pipe to a cable supported from said auxiliary barge;
   (f) moving said lay barge into position above said second complex and while moving said lay barge lowering said attached cable to maintain said pipe in a substantially straight line between said first complex and said lay barge;
   (g) lowering the second end of said pipe and connecting said pipe to the connector on said second complex;
   (h) moving said auxiliary barge perpendicular to the longitudinal axis of said pipe while simultaneously lowering said cable to lay said pipe on its side.

2. The method according to claim 1 wherein the first end of said pipe is connected to said first complex connector at the same time when the second end of said pipe is connected to said second complex connector.

3. The method according to claim 1 wherein the ends of said pipe are not connected to said complex connectors until said pipe is layed on its side.

References Cited

UNITED STATES PATENTS 3,431,739   3/1969   Richardson et al. _____ 61—72.3

FOREIGN PATENTS 863,000   3/1961   Great Britain.

JACOB SHAPIRO, Primary Examiner

U.S. Cl. X.R.

166—.6

UNITED STATES PATENT OFFICE
CERTIFICATE OF CORRECTION

Patent No. 3,524,325             Dated  August 18, 1970

Inventor(s)  Walter Brown

It is certified that error appears in the above-identified patent and that said Letters Patent are hereby corrected as shown below:

Column 2, line 4, "cut" should read -- out --; line 11, after "connections" insert -- have been made in this manner utilizing state-of-the-art connectors --. Column 4, line 36, after "shoe" and before "is" insert -- 36 --.

Signed and sealed this 17th day of November 1970.

(SEAL)
Attest:

EDWARD M. FLETCHER, JR.         WILLIAM E. SCHUYLER, JR.
Attesting Officer                Commissioner of Patents